Figure 1:
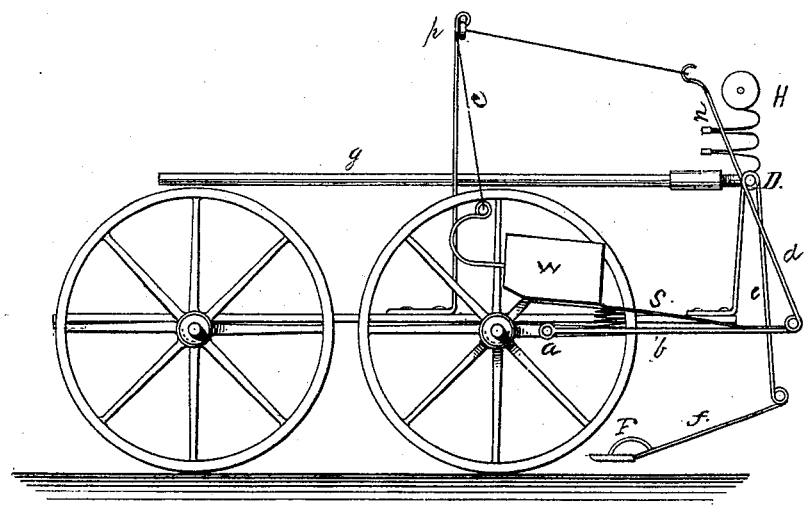
Figure 2:
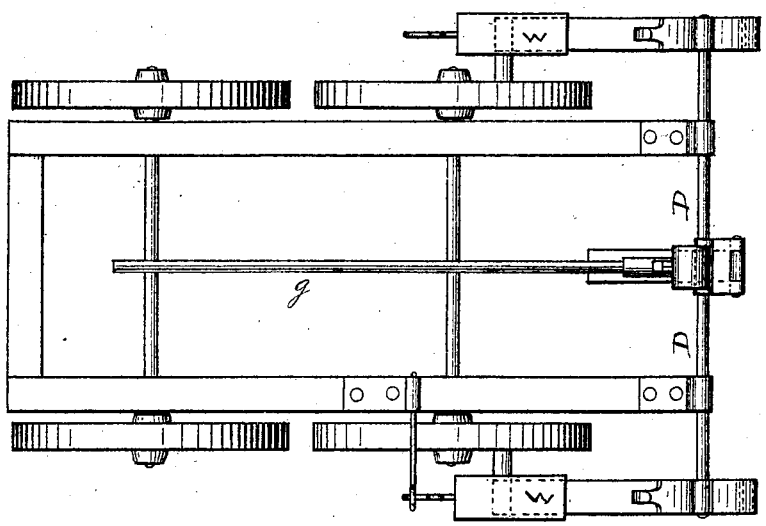

H. FOWLER.
Street-Car Propellers.

No. 150,146. Patented April 28, 1874.

Witnesses:
Edw. N. Down
Alexander Scott

Inventor:
Harvey Fowler

UNITED STATES PATENT OFFICE.

HARVEY FOWLER, OF WASHINGTON, DISTRICT OF COLUMBIA.

IMPROVEMENT IN STREET-CAR PROPELLERS.

Specification forming part of Letters Patent No. 150,146, dated April 28, 1874; application filed March 4, 1874.

*To all whom it may concern:*

Be it known that I, HARVEY FOWLER, of Washington city, District of Columbia, have invented certain Improvements in the Method of Propelling Street-Cars and other Vehicles, of which the following is a specification:

In the case of a street-car there must be an extension of the axle of the front pair of wheels, and a crank attached to each end of said axle; or a truck may be used consisting of either one or two pairs of wheels, with usual connections and partial platform, to be coupled with the passenger-car, in which case the central part of the axle of the driving-wheels may be crank-shaped, or the crank may be outside of said wheels, as in the drawing.

A bar, B, hinged near one end thereof to the truck or car, either forward or in rear of the crank, extends above the same, with pitman attached, if required, for connection with said crank, or, as in the drawing, connected immediately with the crank, and with a swinging bar, b, attached to a roller, D, placed upon bearings at the front of the car or supplemental truck, or otherwise. The said bar B, when centrally placed, is surmounted by a weight, W, consisting of a block of stone, iron, or lead, or a box of sand, or any other heavy substance, adjusted upon a spring, S, said spring being either single or duplicated, composed of one or more flat steel bars, in sections or otherwise, which spring is fastened to the end of the said pitman-bar farthest from the crank; or in case there are two such bars, then to the middle of a transverse bar connecting the ends thereof, or to a spur upon the roller D, which serves as a pivot or joint for said bars, and upon which they turn, or as in the drawing. From said weight W, or the spring supporting the same, rises a standard, H, designed for the support of certain attachments to be made thereto, which are not here specified, because heretofore patented by me. (See Patent No. 107,474, dated 20th September, 1870; also, Patents Nos. 121,714 and 121,713, issued 12th December, 1871.) The roller D is also supplied with an arm or rectangular bar, g, reaching upward to serve as a handle for the same, or as a support, to which may be attached a flexible weighted standard, (Patent No. 121,713, as above,) to be governed in its movement by the hands of the operator, or otherwise; and a hinged bar or jointed lever, e, is attached to the said roller D, underneath the same, and connected with the crank of the driving-wheels, so as to give uniformity to the motion of the said weighted handle with the motion of the weighted spring S. The weighted pitman-bar B and its accompanying apparatus may be duplicated, and made to act upon more than one crank at different angles on the same axle, if so desired.

If the supplemental truck or pair of wheels be used, the coupling should be not only at the level of the platform, but also at the level of the top of the car-body.

What I claim as my invention, and desire to secure by Letters Patent, is—

1. The weighted spring or springs S, in combination with the pitman-bar b, as and for the purpose indicated.

2. The roller D and handle g thereof, and the rectangular-jointed bars d c, attached to the same, in combination with the crank a aforesaid, as and for the purpose specified.

HARVEY FOWLER.

Witnesses:
    EDW. W. DONN,
    W. W. HOLLINGSWORTH.